United States Patent
Farrar et al.

(10) Patent No.: US 7,406,477 B2
(45) Date of Patent: Jul. 29, 2008

(54) DATABASE SYSTEM WITH METHODOLOGY FOR AUTOMATED DETERMINATION AND SELECTION OF OPTIMAL INDEXES

(75) Inventors: Daniel J. Farrar, Waterloo (CA); Anisoara Nica, Waterloo (CA)

(73) Assignee: Sybase, Inc., Dublin, CA (US)

( * ) Notice: Subject to any disclaimer, the term of this patent is extended or adjusted under 35 U.S.C. 154(b) by 361 days.

(21) Appl. No.: 10/709,301

(22) Filed: Apr. 27, 2004

(65) Prior Publication Data

US 2005/0203940 A1 Sep. 15, 2005

Related U.S. Application Data

(60) Provisional application No. 60/521,219, filed on Mar. 12, 2004.

(51) Int. Cl.
*G06F 17/30* (2006.01)

(52) U.S. Cl. .................. 707/102; 707/104.1; 707/3

(58) Field of Classification Search .............. 707/1, 707/3, 101, 2, 102, 104.1
See application file for complete search history.

(56) References Cited

U.S. PATENT DOCUMENTS

| | | | |
|---|---|---|---|
| 5,404,510 A | 4/1995 | Smith et al. ............... 707/2 |
| 5,495,608 A | 2/1996 | Antoshenkov ............. 707/3 |
| 5,615,367 A | 3/1997 | Bennett et al. .......... 707/102 |
| 5,742,806 A | 4/1998 | Reiner et al. ............. 707/3 |
| 5,758,146 A | 5/1998 | Schiefer et al. ........... 707/2 |
| 5,778,354 A | 7/1998 | Leslie et al. ............. 707/2 |
| 5,822,749 A | 10/1998 | Agarwal .................. 707/2 |
| 5,893,088 A | 4/1999 | Hendricks et al. ......... 707/3 |
| 5,913,206 A | 6/1999 | Chaudhuri et al. ........ 707/2 |
| 5,913,207 A | 6/1999 | Chaudhuri et al. ........ 707/2 |
| 5,918,225 A | 6/1999 | White et al. ............. 707/3 |
| 5,926,813 A | 7/1999 | Chaudhuri et al. ........ 707/5 |
| 5,930,785 A | 7/1999 | Lohman et al. ........... 707/2 |
| 5,950,186 A | 9/1999 | Chaudhuri et al. ........ 707/2 |
| 5,960,423 A | 9/1999 | Chaudhuri et al. ........ 707/2 |
| 6,009,425 A | 12/1999 | Mohan .................... 707/8 |
| 6,182,079 B1 | 1/2001 | Lenzie ................. 707/101 |
| 6,223,171 B1 | 4/2001 | Chaudhuri et al. ........ 707/2 |
| 6,263,334 B1 | 7/2001 | Fayyad et al. ............ 707/5 |
| 6,266,658 B1 * | 7/2001 | Adya et al. .............. 707/2 |
| 6,285,996 B1 | 9/2001 | Jou et al. ............... 707/4 |
| 6,289,334 B1 | 9/2001 | Reiner et al. ............ 707/3 |
| 6,338,056 B1 | 1/2002 | Dessloch et al. .......... 707/2 |

(Continued)

OTHER PUBLICATIONS

Valentin, Gary et al., DB2 Advisor: An Optimizer Smart Enough to Recommend Its Own Indexes, Jul. 2001.

(Continued)

*Primary Examiner*—Tim Vo
*Assistant Examiner*—Dangelino N Gortayo
(74) *Attorney, Agent, or Firm*—John A. Smart

(57) ABSTRACT

A database system with methodology for automated determination and selection of optimal indexes is described. In one embodiment, for example, in a database system, a method of the present invention is described for recommending database indexes to be created for optimizing system performance, the method comprises steps of: capturing a workload representative of database queries employed during system use; creating virtual indexes for optimizing system performance during execution of the database queries captured in the workload; computing cost benefits for different combinations of the virtual indexes; and recommending physical indexes to be created based on virtual indexes that have favorable cost benefits for the captured workload.

42 Claims, 10 Drawing Sheets

U.S. PATENT DOCUMENTS

| | | |
|---|---|---|
| 6,353,820 B1 | 3/2002 | Edwards et al. ................. 707/2 |
| 6,356,891 B1 | 3/2002 | Agrawal et al. ................. 707/2 |
| 6,366,903 B1 | 4/2002 | Agrawal et al. ................. 707/2 |
| 6,405,187 B1 | 6/2002 | Egan et al. ..................... 707/2 |
| 6,421,662 B1 | 7/2002 | Karten .......................... 707/3 |
| 6,470,330 B1 | 10/2002 | Das et al. ...................... 707/2 |
| 6,546,394 B1 | 4/2003 | Chong et al. ................ 707/100 |
| 6,549,895 B1 | 4/2003 | Lai ............................... 707/2 |
| 6,591,269 B1 | 7/2003 | Ponnekanti ................. 707/100 |
| 6,615,206 B1 | 9/2003 | Jakobsson et al. .............. 707/3 |
| 6,631,366 B1 | 10/2003 | Nagavamsi et al. ............ 707/3 |
| 6,643,636 B1 | 11/2003 | Au et al. ........................ 707/2 |
| 6,654,039 B1 | 11/2003 | Hollines, III et al. ........ 715/830 |
| 6,678,686 B1 | 1/2004 | Patel et al. .................. 707/100 |
| 6,691,101 B2 | 2/2004 | MacNicol et al. .............. 707/2 |
| 6,694,323 B2 | 2/2004 | Bumbulis ................... 707/101 |
| 6,694,325 B2 | 2/2004 | Jas ............................. 707/102 |
| 6,728,720 B1 * | 4/2004 | Lenzie ....................... 707/101 |
| 6,732,096 B1 | 5/2004 | Au ................................ 707/5 |
| 6,778,977 B1 | 8/2004 | Avadhanam et al. ........... 707/2 |
| 6,785,684 B2 | 8/2004 | Adbo ........................ 707/101 |
| 6,816,854 B2 | 11/2004 | Reiner et al. ................... 707/3 |
| 6,934,701 B1 * | 8/2005 | Hall, Jr. ......................... 707/2 |
| 7,007,006 B2 * | 2/2006 | Zilio et al. ..................... 707/2 |
| 7,047,231 B2 * | 5/2006 | Grasshoff et al. .............. 707/2 |
| 2003/0093408 A1 * | 5/2003 | Brown et al. ................... 707/2 |
| 2004/0260684 A1 * | 12/2004 | Agrawal et al. ................ 707/3 |

OTHER PUBLICATIONS

Chaudhuri, Surajit et al., An Efficient, Cost-Driven Index Selection Tool for Microsoft SQL Server, Proceedings of the 23rd VLDB Conference, Athens, Greece, 1997.

* cited by examiner

DATABASE SYSTEM WITH METHODOLOGY FOR AUTOMATED DETERMINATION AND SELECTION OF OPTIMAL INDEXES

CROSS REFERENCE TO RELATED APPLICATIONS

The present application is related to and claims the benefit of priority of the following commonly-owned, provisional application(s): application Ser. No. 60/521,219, filed Mar. 12, 2004, entitled "Database System with Methodology for Automated Determination and Selection of Optimal Indexes", of which the present application is a non-provisional application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 85057 Bytes, created: Apr. 27, 2004 9:14:40 AM; Object ID: File No. 1; Object Contents: Source code.

BACKGROUND OF INVENTION

1. Field of the Invention

The present invention relates generally to data processing environments and, more particularly, to the automated determination of optimal indexes to use for a given workload environment.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Addison Wesley, 2000.

For enhancing the storage, retrieval, and processing of data records, database systems typically maintain one or more indexes on database tables. A variety of indexes may exist or be created in a database system. For example, an index may be created on a table to support a primary key. Additionally, secondary indexes may be employed for various reasons, such as to improve performance of the database on a particular type of query. For instance, an index created on columns or groups of columns in a table may enable the page containing rows that match a certain condition imposed on the index columns to be located without requiring the database engine to scan all pages in a table to find matching rows.

One of the primary purposes of database systems is to provide information in response to requests submitted by users in the form of database queries. Database systems are typically used to answer both known queries and ad hoc queries. A known query is a query that is frequently run on the system (e.g., on a daily, weekly, or monthly basis). An ad hoc query is a one-time or infrequently run query which usually seeks information not provided by available known queries or reports. During query execution, whether for a known query or a totally ad hoc query, a database system's optimizer must decide at some point which index or indexes (if any) are available for expediting processing of the query.

The benefit of having indexes available is that the optimizer may use them to improve performance for certain types of queries. Over the years, various techniques have been developed to improve an optimizer's ability to select one or more indexes for query processing. There are two main ways that an optimizer may use an existing index to improve processing of a query. The optimizer may use an index to satisfy some ordering or grouping property of the query, or it may use the index to satisfy some predicate(s) that are on the query. With a modern database system, one can safely assume that if an index exists, then the system's optimizer is at least smart enough to check whether it can use that index to its advantage.

Indexes however are not without disadvantages. For example, indexes take up disk space (which can be rather substantial for large databases). Also, indexes incur a maintenance penalty, due to the fact that the indexes must correctly reflect any changes to the underlying table data that they are indexing. Therefore, for a table having a lot of new rows inserted or rows deleted, the database system must incur cycles to maintain the corresponding indexes as rows are inserted and/or deleted.

The ability to "fine tune" a database system has existed for many years. Database systems have provided statistics that allow database administrators to tune or adjust system configuration, in order to achieve better performance. More recently, database vendors have added some degree of automation to the process. For example, Microsoft provides a utility that can recommend indexes. However, that utility runs external to the database engine and typically must perform a substantial number of passes/iterations before reaching a useful recommendation.

IBM has an approach that uses the notion of a virtual index. As the core task, a tool must decide whether to create an index with a given signature. In IBM's system, a virtual index is created inside the database engine, which appears to the system's optimizer as an index available for use. However, the structure is virtual, not real, meaning that it only contains enough in-memory information for the optimizer; it is not a physical structure that must be stored on disk.

The IBM approach has disadvantages, however. The way the IBM system generates virtual indexes relies on a limited series of fixed permutations of the elements of a given query. This can cause very good indexes to be missed and may potentially require a huge number of candidate indexes to be considered. As a result, the performance of the IBM approach is suboptimal.

The IBM approach has an additional problem. In the task of selecting indexes, there is a notion of "separability." This means that some indexes may be useful only if other indexes exist. Therefore, a system cannot achieve optimal results by simply recommending a list of indexes and then indicating that top performing ones should be picked. Here, the removal of some of the indexes (i.e., removal from consideration) may cause some of the better performing ones to also be unavailable for use. This can happen because the optimizer may require certain combinations of indexes to be present in order to use them.

IBM attempted to solve this problem with their implementation as follows. The IBM system creates a set of indexes in the database engine, and then the system attempts to pare down the list of indexes to meet the size constraint specified. Once a recommendation satisfying the given constraints has been made, the system tries to improve upon it by replacing small numbers of indexes in the proposed solution, accepting the modified solution if it appears better. As combinations are tried, the IBM system re-evaluates the benefit (e.g., cost benefit) provided by each index. It will continue considering perturbations of the solution until the user instructs it to stop. However, that approach does not adequately capture the notion of separability, since the cost model employed in selecting the base solution is not updated to take into account indexes that have been removed from the set until this final stage of trying permutations.

What is needed is an approach that recommends a set of indexes providing the best performance value, both in terms of storage (disk space) costs and maintenance costs (as data is updated). Further, the approach desired is one that supplies recommendations faster than currently-available solutions and gives better recommendations. The present invention fulfills these and other needs.

SUMMARY OF INVENTION

A database system with methodology for automated determination and selection of optimal indexes is described. In one embodiment, for example, in a database system, a method of the present invention is described for recommending database indexes to be created for optimizing system performance, the method comprises steps of: capturing a workload representative of database queries employed during system use; creating virtual indexes for optimizing system performance during execution of the database queries captured in the workload; computing cost benefits for different combinations of the virtual indexes; and recommending physical indexes to be created based on virtual indexes that have favorable cost benefits for the captured workload.

In another embodiment, for example, a system that recommends database indexes to be created for optimizing system performance, the system of the present invention is described that comprises: a database system that executes database queries; and an index consultant for capturing a workload representative of database queries executed during typical system use; creating virtual indexes for optimizing system performance during execution of the database queries captured in the workload; computing cost benefits for different combinations of the virtual indexes; and recommending physical indexes to be created based on virtual indexes that have favorable cost benefits for the captured workload.

DETAILED DESCRIPTION

Glossary

Figure 1:
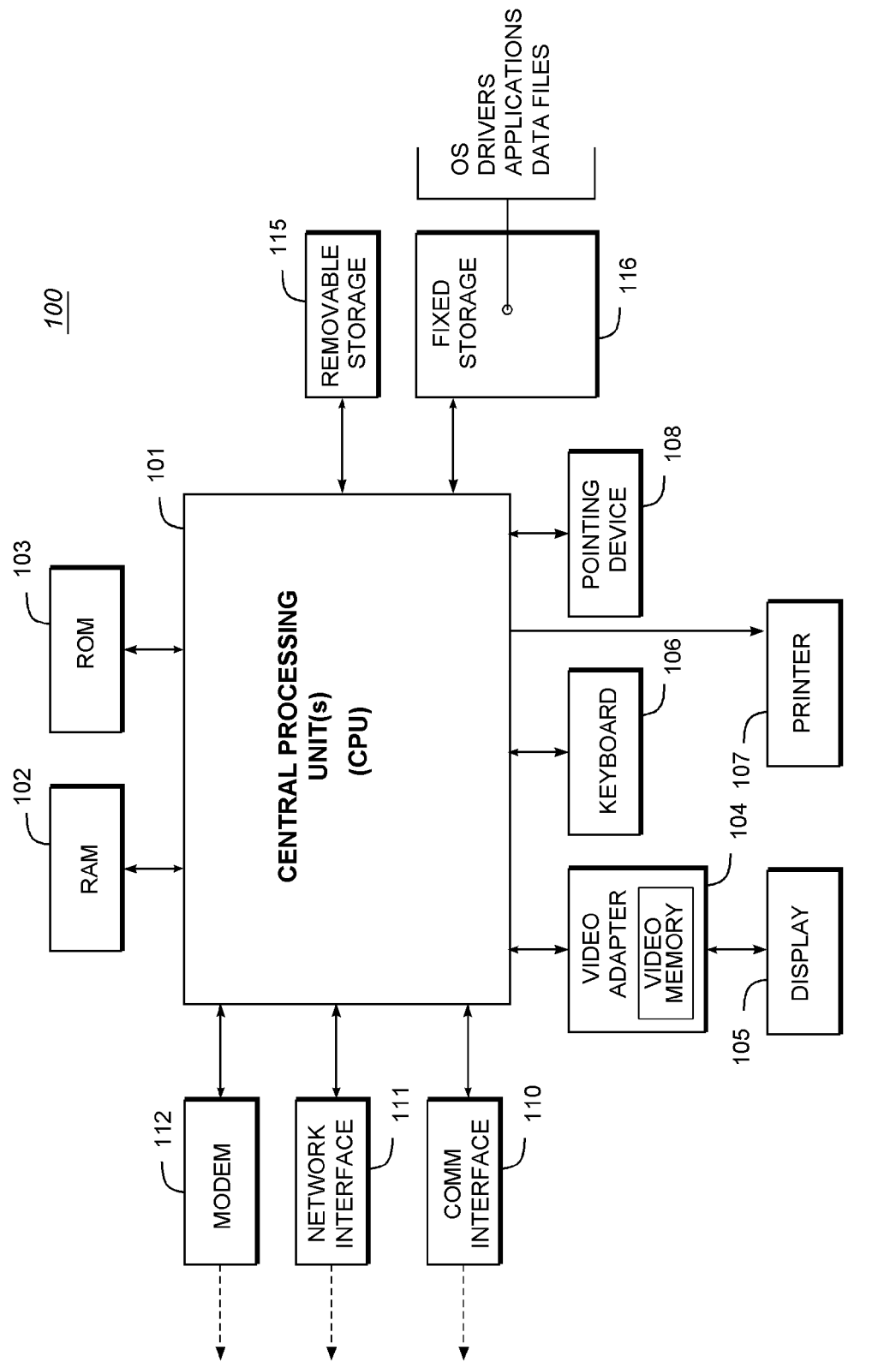
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. A feature of a relational database is that users may define relationships between the tables in order to link data that is contained in multiple tables. The standard user and application program interface to a relational database is the Structured Query Language (SQL), defined below.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5)-1999), the disclosure of which is hereby incorporated by reference.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
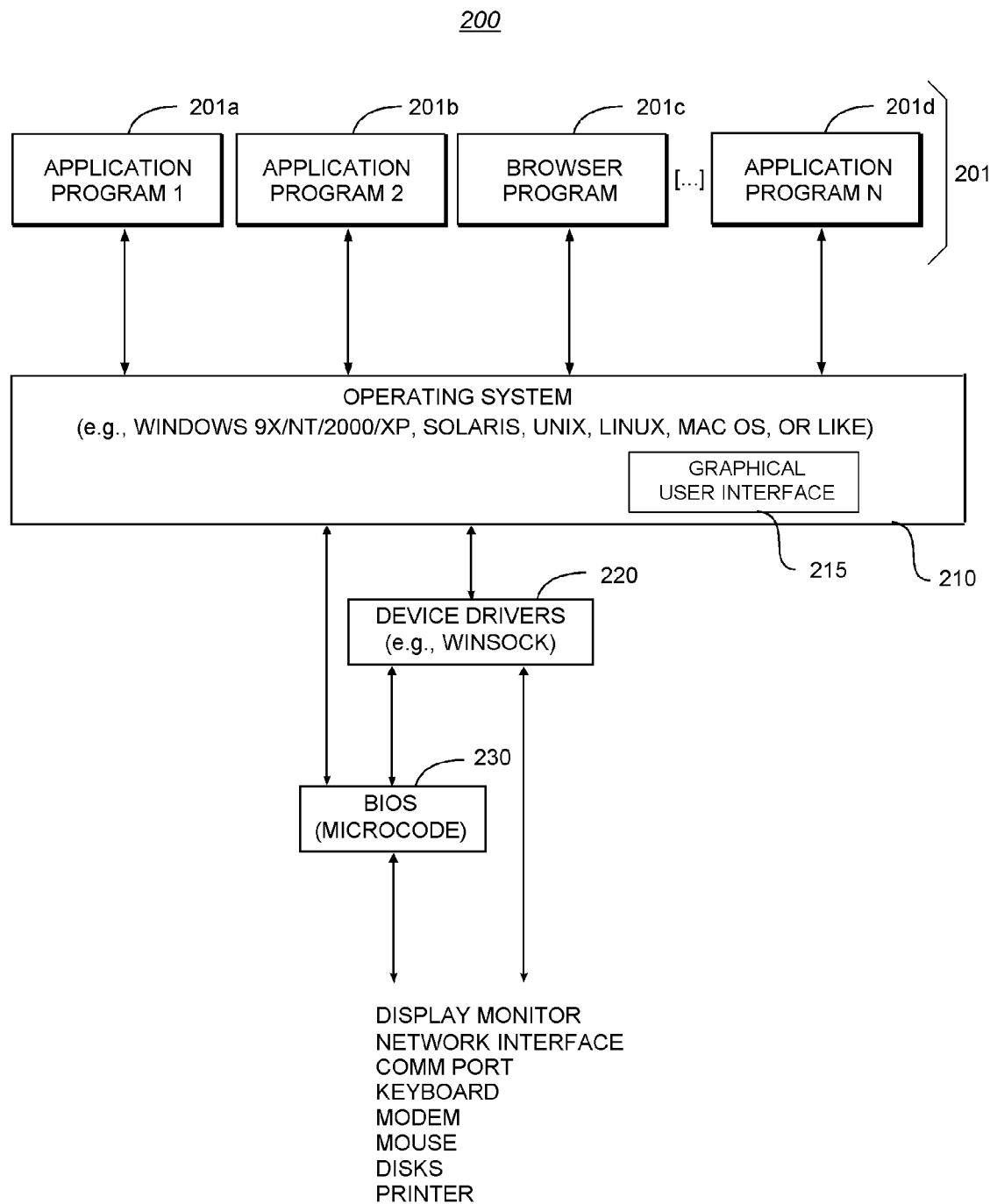
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable computer-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

Client-Server Database Management System

Figure 3:
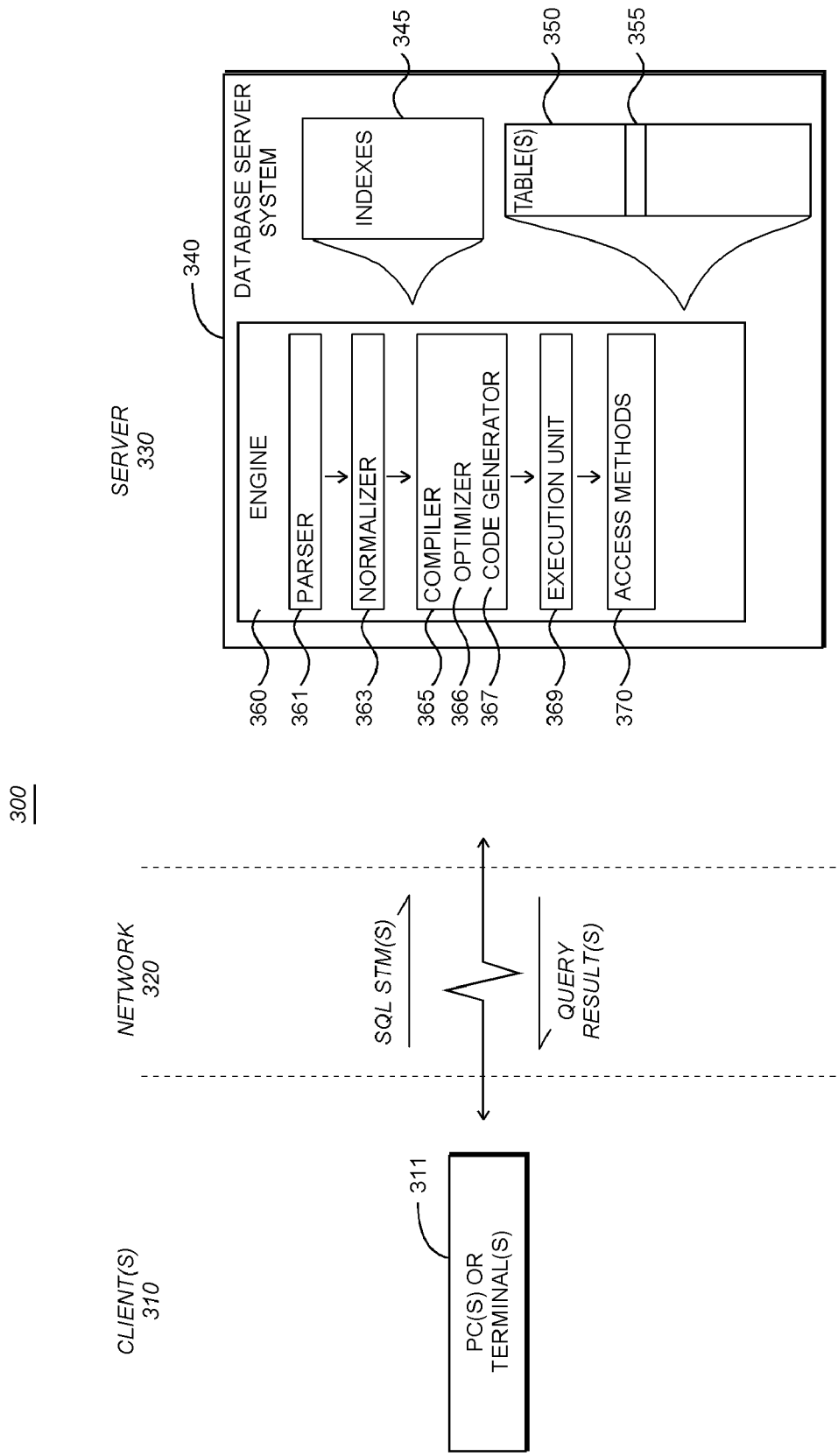
FIG. 3 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 3 illustrates the general structure of a client/server database system 300 suitable for implementing the present invention. As shown, the system 300 comprises one or more client(s) 310 connected to a server 330 via a network 320. Specifically, the client(s) 310 comprise one or more standalone terminals 311 connected to a database server system 340 using a conventional network. In an exemplary embodiment, the terminals 311 may themselves comprise a plurality of standalone workstations, dumb terminals, or the like, or comprise personal computers (PCs) such as the above-described system 100. Typically, such units would operate under a client operating system, such as a Microsoft® Windows client operating system (e.g., Microsoft® Windows 95/98, Windows 2000, or Windows XP).

The database server system 340, which comprises Sybase® Adaptive Server® Anywhere Studio (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), UNIX (Novell), Solaris (Sun), or Linux (Red Hat). The network 320 may be any one of a number of conventional network systems, including a Local Area Network (LAN) or Wide Area Network (WAN), as is known in the art (e.g., using Ethernet, IBM Token Ring, or the like). The network 320 includes functionality for packaging client calls in the well-known Structured Query Language (SQL) together with any parameter information into a format (of one or more packets) suitable for transmission to the database server system 340.

Client/server environments, database servers, and networks are well documented in the technical, trade, and patent literature. For a discussion of Sybase®-branded database servers and client/server environments generally, see, e.g., Nath, A., "The Guide to SQL Server", Second Edition, Addison-Wesley Publishing Company, 1995. For a description of Sybase® Adaptive Server® Anywhere Studio, see, e.g., "Adaptive Server Anywhere 9.0.1: Core Documentation Set," available from Sybase, Inc. of Dublin, Calif. This product documentation is available via the Internet (e.g., currently at sybooks.sybase.com/aw.html). The disclosures of the foregoing are hereby incorporated by reference.

In operation, the client(s) 310 store data in, or retrieve data from, one or more database tables 350, as shown at FIG. 3. Data in a relational database is stored as a series of tables, also called relations. Typically resident on the server 330, each table itself comprises one or more "rows" or "records" (tuples) (e.g., row 355 as shown at FIG. 3). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 310 issue one or more SQL commands to the server 330. SQL commands may specify, for instance, a query for retrieving particular data (i.e., data records meeting the query condition) from the database table(s) 350. In addition to retrieving the data from database server table(s) 350, the clients 310 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 310 (via network 320)

are processed by the engine 360 of the database server system 340. The engine 360 itself comprises a parser 361, a normalizer 363, a compiler 365, an execution unit 369, and an access methods 370. Specifically, the SQL statements are passed to the parser 361 which converts the statements into a query tree—a binary tree data structure which represents the components of the query in a format selected for the convenience of the system. In this regard, the parser 361 employs conventional parsing methodology (e.g., recursive descent parsing).

The query tree is normalized by the normalizer 363. Normalization includes, for example, the elimination of redundant data. Additionally, the normalizer 363 performs error checking, such as confirming that table names and column names which appear in the query are valid (e.g., are available and belong together). Finally, the normalizer 363 can also look-up any referential integrity constraints which exist and add those to the query.

After normalization, the query tree is passed to the compiler 365, which includes an optimizer 366 and a code generator 367. The optimizer 366 is responsible for optimizing the query tree. The optimizer 366 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 367 translates the query execution plan selected by the query optimizer 366 into executable form for execution by the execution unit 369 using the access methods 370.

Allposite data in a typical relational database system is stored in pages on a secondary storage device, usually a hard disk. Typically, these pages may range in size from 1 Kb to 32 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

For enhancing the storage, retrieval, and processing of data records, the server 330 maintains one or more database indexes 345 on the database tables 350. Indexes 345 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter "A".

The above-described computer hardware and software are presented for purposes of illustrating the basic underlying desktop and server computer components that may be employed for implementing the present invention. For purposes of discussion, the following description will present examples in which it will be assumed that there exists a "server" (e.g., database server) that communicates with one or more "clients" (e.g., personal computers such as the above-described system 100). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Automated Determination and Selection of Optimal Indexes

Introduction

One of the most effective ways to improve the performance of a database system in executing a given query is to create an index that can be used for executing the query. If the query optimizer selects an access plan that uses that index, the query may be satisfied in a small fraction of the time that would have been otherwise required. However, indexes require both space and time resources. Indexes are stored on index pages, which exist separately from the pages used to store table data. While the index only needs to store as much row data as is contained in the key, it must also store its own structural data. Although the number of pages required to store a given index is generally smaller than the number of pages required to store the data in the table, the index may still occupy substantial space. This is especially true for indexes with large keys over tables with few columns but many rows. In many applications, disk space is limited by the physical devices on which the applications run or by the needs of other applications running on a given server. Accordingly, it is important to maximize the usefulness of any indexes occupying disk space.

Indexes also introduce a time and performance penalty for maintenance. Any time rows in a table are added, changed, or deleted, indexes on that table must be changed to reflect the new data. Thus, while typically only one index can be used for a given table to increase query performance, all indexes for that table must usually be updated when the data changes. This frequently involves reading several pages for each index into memory, since a specific index page for a large index is unlikely to remain in the cache.

The problem of determining what indexes are suitable for an individual query is relatively straightforward. Indexes created on columns with equality or inequality predicates, and indexes that satisfy data ordering requirements, will usually be considered by the optimizer. It is easy for a user to create such indexes to benefit the performance of a single query (although the selection of optimal indexes for a single query is non-trivial). However, it is difficult for a user to determine an optimal set of indexes for a "set" of queries due to the interactions between indexes. The present invention comprises a system (sometimes referred to herein as an "index consultant" or "IXT") providing methodology for automated determination and selection of an optimal set of indexes. The solution selects an optimal or near-optimal set of indexes given a database, a set of queries, and a set of time and space constraints. The system and methodology of the present invention is particularly useful in the context of a low administration database system.

Overview of System Use

The present invention provides an index consultant that is an improvement over the previously described approach of using virtual indexes to recommend top performing indexes. The approach of the present invention is to capture a "workload"—that is, a set of queries that is representative of how the database is being used. Based on the database and the data that it contains, the present invention is able to recommend the indexes that will provide the best performance value in handling the workload.

Use of the present invention is as follows. A database administrator (DBA) or user runs a database application with a typical workload that is contemplated for the application. Now, the user (e.g., DBA) may instruct the system to capture this workload. In the currently preferred embodiment, the system provides a "record" (software user interface) button that allows a user (e.g., typically the DBA) to easily indicate that the system should track and capture a workload. The present invention, which is currently implemented as an administration suite for the database engine, communicates directly with the database engine to track the workload. This includes recording the SQL text of all the queries operating during the capture of the workload. Additionally, state information in the database is captured, such as the settings for certain options that affect how queries are optimized. Once this is done, the system has captured a complete "problem instance", which comprises a set of workloads and the database state information. Now, the user (e.g., DBA) may set parameters to influence the selection of indexes. For example, the DBA may indicate how much disk space should be allotted for indexes. Additionally, the DBA may specify whether certain types of indexes should be considered at all. After the DBA has finished inputting configuration settings, he or she instructs the system to then undertake investigation of which indexes to recommend, based on which ones have favorable cost benefits for the captured workload.

Modes of Operation

In the presently preferred embodiment, the index consultant has two modes of operation. First, it can consider the set of physical indexes that exist in the database as unchangeable, and make its recommendations based on this constraint. In this case, the consultant will try to recommend a set of indexes that provides an incremental benefit to the existing indexes. Second, the index consultant can invoke the optimizer with the instruction that the optimizer is free to drop any existing physical indexes; in this case, the consultant will try to recommend a set of indexes that provides the greatest absolute benefit. The cost benefit information is taken into account when the system determines which indexes to drop during a paring operation.

System Components and Basic Operation

Figure 4A:
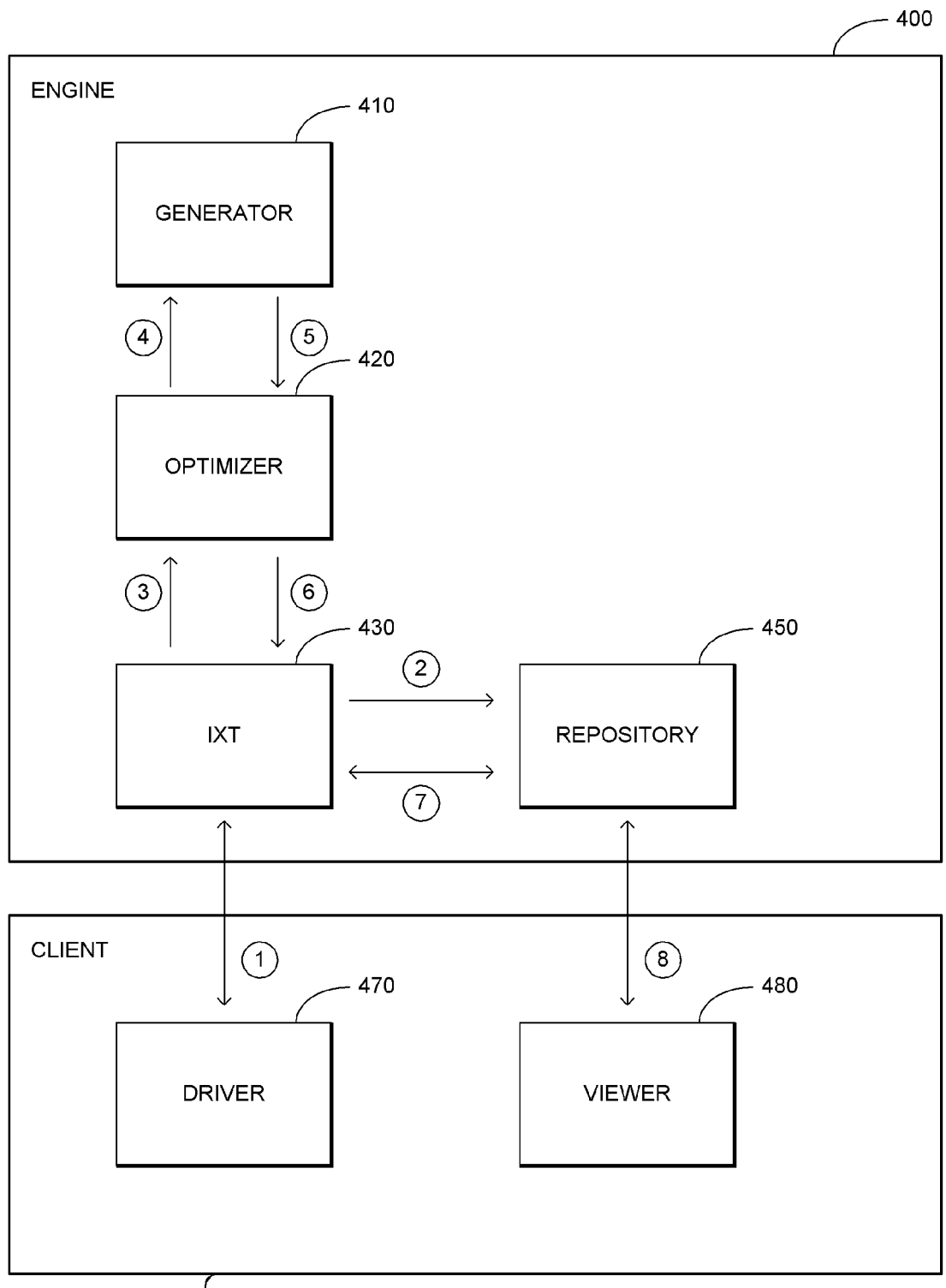
FIG. 4A is a high-level block diagram illustrating basic operation of the system of the present invention for determining an index recommendation.

FIG. 4A is a high-level block diagram illustrating basic operation of the system of the present invention for determining an index recommendation. For clarity of description, the diagram is simplified to simply focus on a database engine 400 and a database client 460, as would be preferably employed for embodiment of the present invention. As shown, the database engine 400 includes a generator 410, an optimizer 420, an index consultant (IXT) module 430, and a repository 450. The client 460 (which of course would typically be one of a number of concurrent clients in a working embodiment) includes a driver 470 and a viewer 480.

Figure 4B:
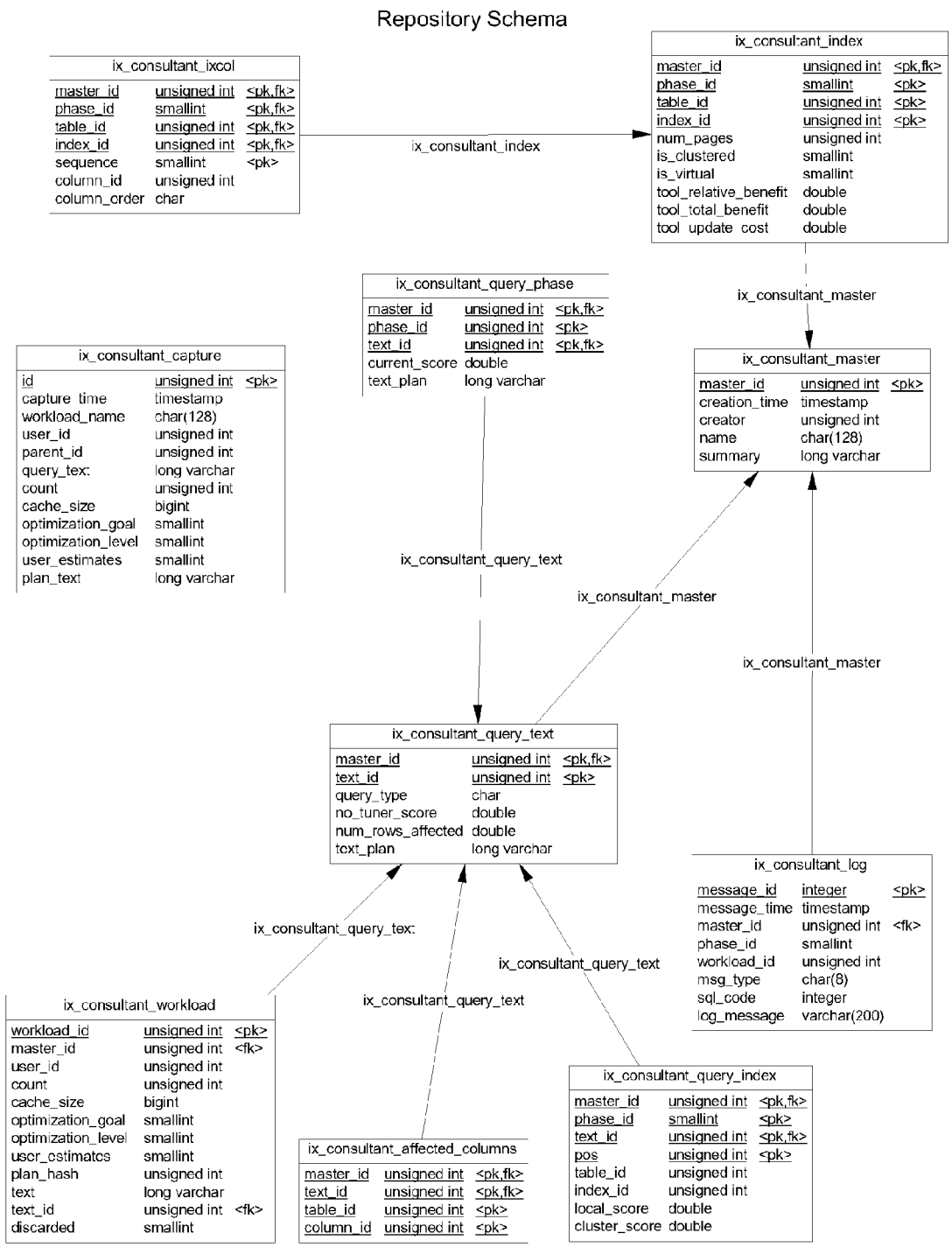
FIG. 4B is a diagram showing the underlying schema of the repository itself.

In operation, the system determines an index recommendation as follows. First, the queries of the work set are transferred from the client 460 to the engine 400. This occurs by the driver 470 inserting the queries into the repository 450. FIG. 4B is a diagram showing the underlying schema of the repository 450 itself. Next, the index consultant (IXT) module 430 examines each query stored in the repository 450 to see if it is similar to a query that has been previously analyzed. If the query is not similar to a previously analyzed query, the IXT module 430 instructs the optimizer 420 to optimize the query. Then, upon examining the query and in conjunction with data structures constructed within the optimizer 420, the generator 410 generates a list of possible (virtual) indexes that could be used to assist in executing the queries. Each virtual index is an in-memory data structure that simulates the way an index could be used by the optimizer 420 to satisfy a given query (if the index actually existed). The index consultant 430 communicates these possible indexes to the optimizer 420. Now, the optimizer 420 has additional indexes (albeit a list of virtual indexes) available for helping a given query. Based on the list of "available" indexes, the optimizer 420 may select one or more of those indexes for use. Any index selected by the optimizer 420 is recorded by the IXT module 430 in the repository 450. Thus at this point, the system has a list of queries and a list of beneficial virtual indexes, each virtual index being helpful in isolation for a given query.

Next, the driver 470 creates the complete set of recommended virtual indexes, so that they all exist within the optimizer 420 at once. The creation of the virtual indexes will allow the system to capture the effect of how each given index interacts with every query in the workload. This is done by running the workload through the optimizer 420 again and storing the resulting access plans in the repository 450. At this juncture, the system has a fixed set of indexes (i.e., virtual indexes) and the system may discern how each query performs in the presence of all of these indexes.

If a given query has a statement that would be associated with an index maintenance cost (namely, a query with a statement of type insert, update, or delete), the system associates a negative benefit for the affected indexes (if any). A positive benefit, on the other hand, accrues when an index saves time in execution of a query (for the query's access plan) as compared with operation of the optimizer 420 and resulting access plan in the absence of any recommended virtual indexes. Here, the optimizer's built in cost model is employed to determine the benefits of an index (if any). For example, the system may ask the optimizer 420 to optimize a given query, whereupon the optimizer may assign some number of cost units based on its cost model. The system of the present invention employs an additional cost model that is strictly part of the index consultant 430. Here, the additional cost model figures out the cost units incurred in the case of an insert, update, or delete statement (i.e., negative costs benefit). Therefore, the additional cost model may be used to determine the maintenance cost that may be incurred in order to maintain a given index. This additional cost is treated as a negative benefit.

Three additional factors are considered when computing the benefit of a virtual index: indexes marked as clustered are favored; indexes on large tables are favored; and indexes which benefit a large number of distinct queries (relative to other indexes) are favored. Each of these factors is normalized by considering the most beneficial index in each respect, and then interpolating a value for the index under consideration. In the currently preferred embodiment, the final benefit for a virtual index is then a weighted sum of these normalized factors. For example, in the current implementation, the weightings attached to each element of the benefit are (cost of updates, 20; number of queries affected, 20; size of table, 40; optimizer estimate of reported benefit, 35; "clusteredness", 20). Those skilled in the art will appreciate that alternative weightings could be assigned to these factors, as desired.

If the series of recommended indexes is within the disk space constraint (e.g., specified by the DBA), the system presents the list of indexes to the DBA, whereupon he or she may elect to create (or not create) actual physical indexes based on those recommendations. However, the traditional index selection problem is one in which there is much less space available than is needed to store the list of indexes that could be created. Because the system has suggested virtual indexes for every query in the workload, it may very well be the case that there are more indexes in the list than could be fit on available disk space. Therefore, in accordance with the present invention, the system includes a technique to pare down the list of recommended indexes. First, the system sorts the list of indexes in terms of benefit. A bottom portion (i.e., a portion containing the least beneficial indexes) is eliminated from the list of recommended indexes. In the currently preferred embodiment, the bottom 20 percent is eliminated, for example.

The new reduced list may now be passed back to the optimizer 420, with the optimizer again being instructed to re-optimize all of the queries in the workload. Here, for example, it may be the case that a retained index is similar enough to a dropped index that the optimizer is able to use it as a second best approach (for the access plan). The system may iterate through this process such that the system can determine the benefits that each query sees with the reduced list. At the conclusion of this iteration, the system may determine an optimal set of indexes that meets the size constraint. The system also keeps track of indexes (particularly, secondary indexes) that exist but are not referenced by any queries of the workload. These can be flagged to the DBA for possible elimination.

Figure 4C:
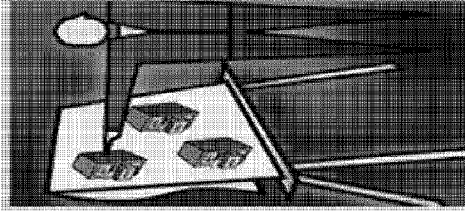
FIG. 4C is a bitmap screenshot illustrating an interface presented to the DBA which enables the DBA to view the query plans that were chosen before and after the index recommendations for each query, as well as the associated cost estimates.

Whenever the system has a list of recommended indexes that satisfy the criteria specified by the DBA, the system displays a graphical user interface that lets the DBA review the results of the analysis. FIG. 4C, for example, is a bitmap screenshot illustrating an interface presented to the DBA which enables the DBA to view the query plans that were chosen before and after the index recommendations for each query, as well as the associated cost estimates. The interface displays a list of the virtual indexes recommended, and how many queries used those indexes. Additionally, the interface shows how many queries will cause the indexes to incur maintenance costs, including what is the estimated cost of these indexes. Further, the interface allows the DBA user to automatically create a SQL script that creates the desired new indexes and drops any undesired indexes (if any). Running the script causes all of the recommendations to be implemented (i.e., indexes created on disk).

Two other modes of operation exist for the index consultant. Previously, the discussion has focused on a system with a large set of queries where global optimization of the database is desired. In a first alternative mode of operation, the user can directly run the index consultant from an interactive SQL session (e.g., using an ISQL-type tool). Here, the user may use the index consultant to recommend a set of optimal indexes for a single query. In that instance, the system performs a somewhat limited version of the first phase of determining a recommended list of indexes for the query. Basically the query is passed to the optimizer which in turn goes through the same process of suggesting possible indexes. Based on its analysis, the optimizer may pick some of those indexes for the query, in which case those indexes are returned as the recommendation. If it does not select one of the indexes, the optimizer returns no recommendation. As another mode of operation, the user can manually issue interactive SQL statements (i.e., from the ISQL interface) that directly create virtual indexes. This allows an experienced DBA to manually create virtual indexes and see how the optimizer behaves in their presence. This allows the DBA to perform a "what if" analysis without incurring the cost of performing that analysis with actual indexes (which must be physically created and then deleted).

Candidate Index Generation

During the preoptimization portion of the process, the optimizer searches for relevant indexes that will help it match predicates or provide useful orderings. The system's index generator, ixt_Generator, examines the wishlists (for either "sargable" (search argument) predicates or interesting properties such as order properties or grouping properties) and generates virtual indexes based on combinations of these conditions. When considering sargable equality predicates for a given base table, the generator generally takes all possible combinations of columns appearing in the sargable equality predicates and generates virtual indexes for them. All virtual indexes generated for columns in equality predicates are completely "don't care" (order independent)—that is, the ordering of the columns does not matter and may change. Interesting property wish-lists may also contain elements that are "don't care." When the optimizer looks for relevant indexes during preoptimization, the optimizer also relies on an index supplier, ixt_IndexSupplier, to supply possible indexes. The supplier encapsulates all of the virtual index code, making sure that virtual indexes are considered by the optimizer, and that disabled physical indexes are not considered.

When considering indexes for satisfying interesting properties (for example, an order property corresponding to an ORDER BY clause), the generator examines each index it has already generated, and tries to "extend" it with the missing columns. To extend an index means to create a copy of it, then manipulate/add columns to match the given interesting property. If the generator can re-arrange the "don't care" columns to match the order/property it is looking for, it will do so. Otherwise, the generator will do the best it can, and then append necessary columns to the end, since an interesting property is not affected by a prefix of columns used in equality predicates. In an additional pass, all existing indexes are extended with columns from sargable inequality predicates, if possible. Note that all virtual indexes are generally thrown away (e.g., by dropping the heap on which they exist and resetting the appropriate counters) at the beginning of each phase of index tuning.

Detailed Operation

The following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

Figure 5A:
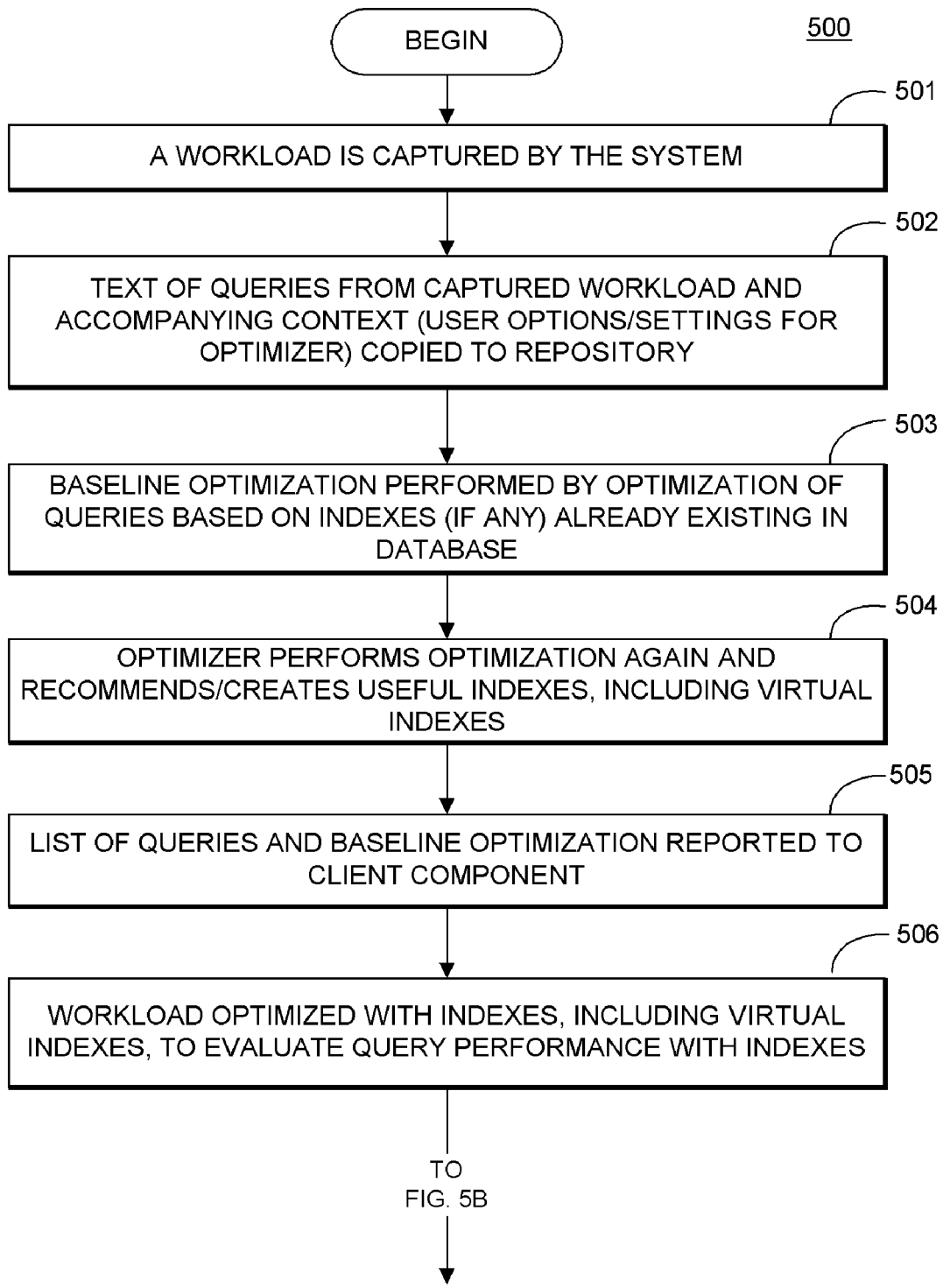
FIGS. 5A-B comprise a single high-level flowchart summarizing basic operation of the system.
Figure 5B:
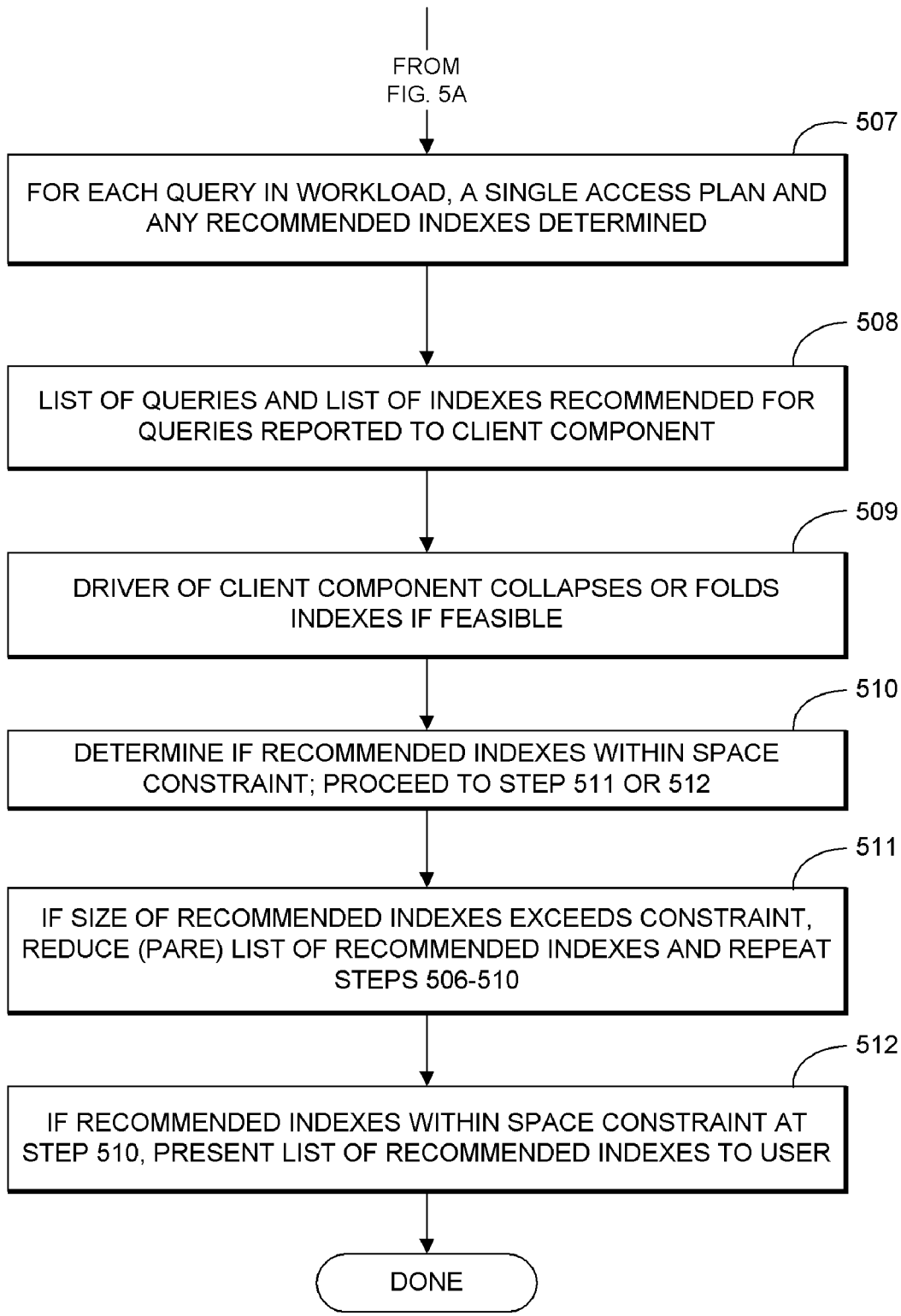

FIGS. 5A-B comprise a single high-level flowchart 500 summarizing basic operation of the system. At step 501, a workload is captured by the system. Here, the system captures a set of queries and the user's specifications (configuration settings). Now, the index consultant may be invoked to recommend indexes for the workload. At step 502, the index consultant copies the text of the queries (from the captured workload) and the accompanying context (e.g., user options/settings for the optimizer)—the workload metadata—into a "workload table" residing in the repository.

At step 503, the index consultant reads in each row of information formation from the workload table for determining how option settings should affect the current connection, and then performs a baseline optimization using existing indexes. In the current embodiment of the underlying database system, each database connection (and each cursor within a connection) is maintained in an independent manner (i.e., in effect, in a sandbox). This allows the database system to change option settings and optimizations for one particular connection (e.g., corresponding to a particular query of a particular user) without affecting any other connections. In normal operation, the database would receive a query, parse the query, optimize the query, then build a corresponding query (execution) plan and run it. In step 503, the system performs the parsing and optimization tasks, but does not build a query plan for execution. In this manner, the system can determine the effects of optimization without having to actually build a query plan (and all of the structures that go with it) and execute it. Therefore, this step allows the system to efficiently establish a baseline optimization (i.e., "vanilla costs") by optimizing the query based on indexes that already exist in the database (or in the absence of any indexes, at the user's option). This first phase determines what the query normally costs. When the system performs the optimization process, the system first parses the query and builds an optimization structure, and then performs the optimization calculation. The system is able to compute a signature based on the parsed query and compare that signature to previously seen queries. In this manner, the system may detect queries that it has already seen, and in those instances simply increment a (reference) counter (indicating that the query has been seen multiple times).

At step 504, the optimizer is instructed to again perform an optimization but this time to also recommend and/or create useful indexes, including virtual indexes. This occurs as follows. Any time the optimizer is going to scan a table (i.e., through the execution plan), it has a list of predicates that apply to that table (e.g., an expression with a column equal to a value, greater than a value, etc.). The optimizer also maintains an interesting property "wish list," expressing a desire that the results coming back from a table are ordered or grouped in a certain manner. Based on the combination of predicates and desired order properties, the system may create a series of indexes that may be useful for the optimizer. To do this, the system starts with a blank virtual index and then tries adding columns from sargable predicates. Some of the columns are position independent, others are not. For example, an column used in an inequality predicate has to appear at the end of the index. The position dependency of predicates is noted during this process. As the optimizer proceeds, it continues to build these virtual structures, which may be referred back to as needed during the process. During this process, the optimizer may uncover certain optimizations which may depend on having a specific ordering. This information may be rolled back into the virtual indexes. For example, if a virtual index has been created at the low level of a table scan with columns specified in no particular order (i.e., as don't care columns), the ordering information may be added into the virtual index by specifying that the virtual index is now required to have a specific order (i.e., the order is (at least partially) locked into place). The process of adding constraints to the ordering of columns in a virtual index is called "hardening" the index. Each column in a virtual index also has a sortedness associated with it. Columns may be either ascending or descending, or marked as insensitive (that is, having an unspecified sortedness). Columns marked as insensitive may later be converted to ascending or descending columns, either during hardening within the optimizer, or by the client (software) component.

At step 505, this information is reported to the client (software) component. In the currently preferred embodiment, the driver (of the client software) polls the tables in the repository to retrieve this information, and it may then build up a series of client-side objects that reflect the information in the repository. In the currently preferred embodiment, the polling mechanism occurs at the end of each phase, including at the end of this first phase (or phase 1). At this point, the client polls all information so that it can determine that the system is working with accurate cost information. By the time this first phase is complete, the system will have stored in the repository a list of all the queries seen (including how many times each has been seen), baseline optimizations (i.e., baseline or "vanilla" costs), and optimizations using virtual indexes for each query.

After the virtual indexes have been created, at step 506 they are passed back to the optimizer, so that the workload may be run through the optimizer again with the virtual indexes. At this juncture, the system has a fixed set of indexes (including the virtual indexes as well as any previously existing indexes) and the system may evaluate how each query performs in the presence of all of these indexes. The optimizer maintains enough information (in the optimizer's internal data structures) that it is able to determine what the access plan would then be if that query were to be executed. The optimizer records all of the virtual indexes that would be used for that access plan, including the cost of executing the query if the query were run with those virtual indexes. Therefore, at this point, the system has both a baseline cost and an improved cost for the query (in the presence of all of the indexes recorded for the optimization). For each query in the workload, at step 507 a single access plan and any recommended indexes are determined. It should be noted that one or more recommended indexes (if any are recommended) may be determined for an access plan. As the optimizer goes through the process of optimizing a single query, it will go through the process of generating virtual index structures multiple times (basically, for each table that it looks at). The index consultant will invoke the optimizer for each query that is in the workload.

By the time the recommendation process is done, the system will have stored in the repository a list of all the queries seen (including how many times each), a list of all virtual indexes that were recommended for each query, and a list of which indexes the individual queries used. At step 508, this information is reported to the client (software). As described above, in the currently preferred embodiment the driver (of the client software) polls the tables in the repository to retrieve this information, and it may then build up a series of client-side objects that reflect the information in the repository. At step 509, the driver of the client component will then collapse or fold some of the indexes, if feasible. For example, some indexes have a set of columns that are supersets of the columns of other indexes, in which case the indexes may be identified and combined into a single index with little or no impact on the quality of the optimization. For instance, consider a query that recommends an index on column A of a table, and another query that recommends an index on columns A and B of that same table. The driver includes logic to recognize that it may create the latter index (on columns A and B) to satisfy both queries, thus skipping the creation of the index solely on column A (and thereby saving space and maintenance costs). The driver logic is aware of indexes with don't care columns and can preserve this information when collapsing similar indexes. The driver logic is also aware of columns that do not have complete sorting information specified (that is, they are neither ascending nor descending—they are sort insensitive) and can preserve this information when collapsing similar indexes. The driver can also recognize that two virtual indexes have columns with opposite sortedness values specified (such that a backward scan of one index is equivalent to a forward scan of the other), and that the two indexes can be combined into a single virtual index.

A more detailed example of how similar indexes are folded together follows. Assume the system has considered a workload of three queries, and recommended one index for each query. The three recommended virtual indexes are all over the same base table. One is on column A(insensitive); one is on column A(ascending),B(descending); and one is on column A(insensitive),B(ascending). Assuming the system considers these indexes in this order, it will first note that the first two virtual indexes can be used to answer the same queries; it will therefore combine them into a virtual index having columns A(ascending),B(descending). The system will then compare this to the third virtual index, and note that a backwards scan of the third index is equivalent to a scan of the newly combined index. It will thus have collapsed all three indexes into a single virtual index having columns A(ascending),B(descending).

At step 510, the series (list) of recommended indexes is evaluated to determine if it is within the applicable disk space constraint (e.g., specified by the DBA). The process then proceeds to either step 511 or 512 based upon this evaluation. If creation of the indexes based on the list of recommended indexes requires disk space that is in excess of the constraint, at step 511 the system proceeds to reduce the list of recommended indexes by first sorting the list in terms of benefit and then eliminating the least beneficial indexes from the list. As previously described, the list of recommended indexes is sorted based on the benefit provided by each index. The portion at the bottom of the sorted list which contains the least beneficial indexes is eliminated. For example, in the currently preferred embodiment, the bottom 20 percent is eliminated. Those skilled in the art will appreciate that a different percentage or mechanism for reducing the size of the list could also be used, as desired. The reduced list is then passed back to the optimizer, with the optimizer again being instructed to repeat steps 506-510 to re-optimize the queries in the workload based on the reduced list of indexes. The system may iterate through this process multiple times. On each iteration, a portion (e.g., the bottom 20 percent) is pared off the list of recommended indexes.

The iteration through the various phases continues until the result set has been pared enough so that the result set meets the constraint evaluated at step 510 (i.e., size constraint specified by the DBA). If this evaluation determines that the series of recommended indexes is within the space constraint, at step 512 the system presents the list of indexes to the user (e.g., DBA). At this point the information currently in the tables of the repository is displayed and the process is complete. The DBA may then elect to create (or not create) actual physical indexes based on those recommendations. For example, the DBA may then generate a SQL script with the various create index statements or drop index statements required.

Driver Operation

The driver (i.e., driver 470) initiates the execution of phases, and interprets the results. After the workload has been loaded, the driver runs phase 1. After phase 1, it initializes its "Instance" structures. The Instance contains all the information about tables, physical indexes, and queries, that do not change from phase to phase. The Phase contains references to the Configurations and Indexes that were generated in the given phase. A Configuration object is the association between a query and the indexes used to answer it in a particular phase. Indexes contain Elements, which bind columns to sort orderings. The driver relies heavily on internal references. Although such an approach may be slightly more expensive to set up, it makes for faster retrieval and summary of the relevant information.

Figure 6A:
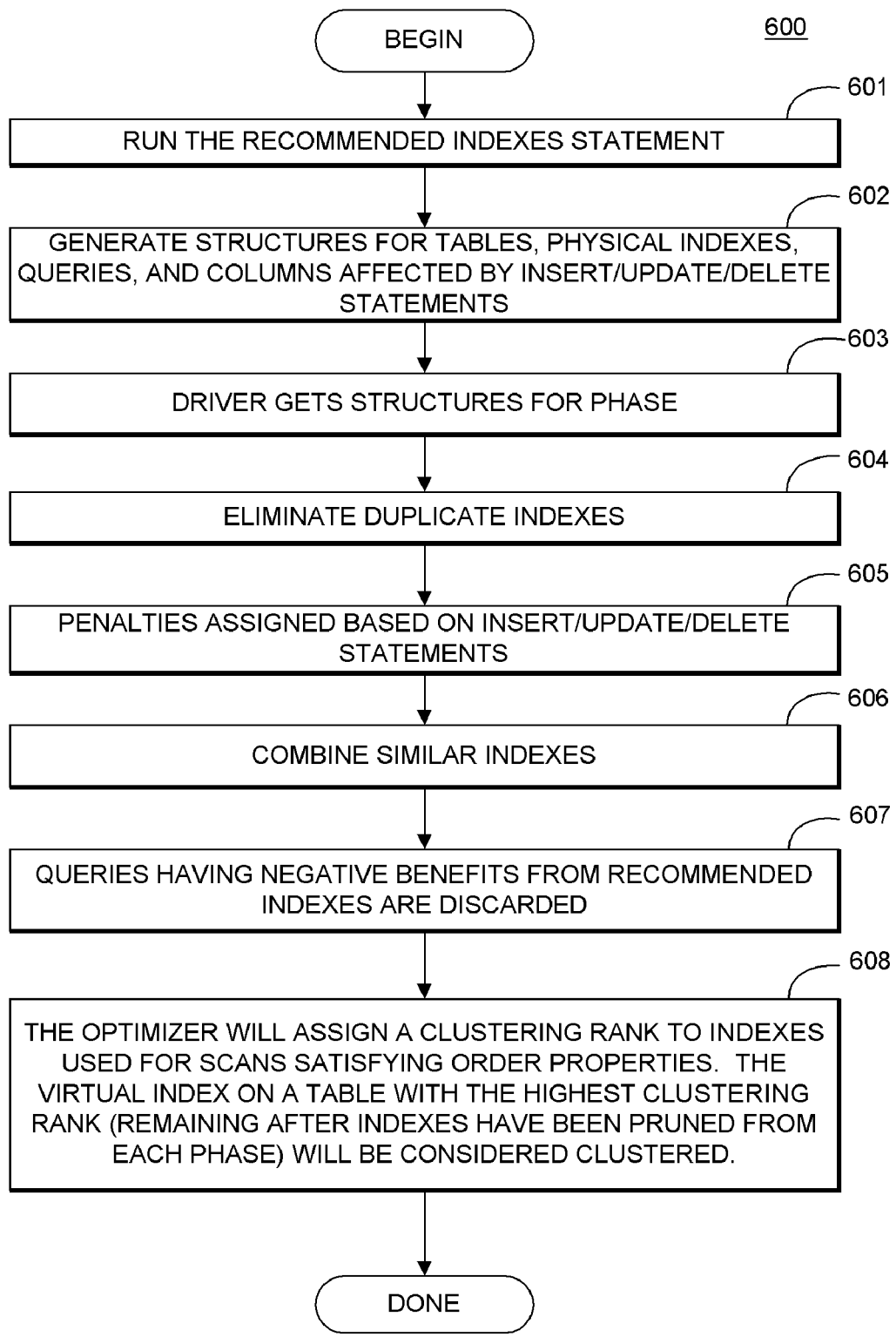
FIG. 6A is a high-level flowchart summarizing basic operation of the driver in the first phase of processing.

FIG. 6A is a high-level flowchart 600 summarizing basic operation of the driver in the first phase of processing (phase 1). This first phase of operations by the driver involves the following steps. The process commences with running the recommend indexes statement at step 601. Next, at step 602 the structures for tables, physical indexes, queries, and columns affected by insert, update, and delete statements are generated. At step 603, the driver gets the structures for this phase (recommended indexes). Duplicate indexes are then eliminated at step 604. This includes eliminating duplicate indexes both between and within queries.

After duplicate indexes have been eliminated, at step 605 penalties are assigned based on insert, update, and/or delete statements. These penalties are assigned to reflect the costs of maintaining an index for queries having these statements. Next, at step 606 similar indexes are combined. At step 607, queries that have negative benefits from the recommended indexes are discarded. At step 608, the optimizer will assign a clustering rank to indexes used for scans satisfying order properties. The virtual index on a table with the highest clustering rank (remaining after indexes have been pruned from each phase) will be considered clustered.

Figure 6B:
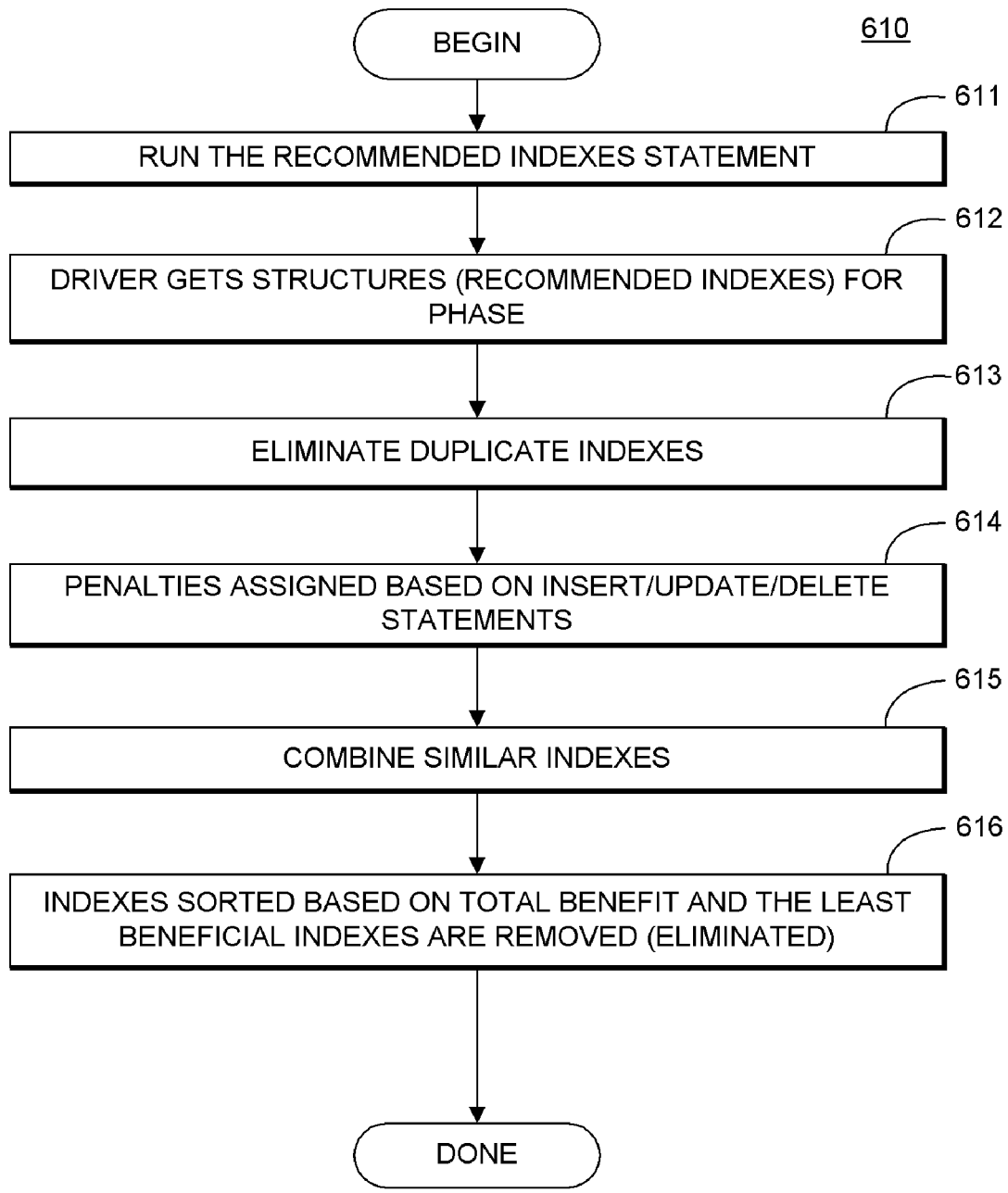
FIG. 6B is a high-level flowchart summarizing basic operation of the driver in the second and subsequent phases of processing (i.e., after the first phase).

FIG. 6B is a high-level flowchart 610 summarizing basic operation of the driver in the second and subsequent phases of processing (i.e., after the first phase). These phases of operations each involve the following steps. A phase commences with running the recommend indexes statement at step 611. Next, at step 612 the driver gets the structures for this phase (recommended indexes). Duplicate indexes are then eliminated at step 613. This includes eliminating duplicate indexes both between and within queries.

After duplicate indexes have been eliminated, at step 614 penalties are assigned based on insert, update, and/or delete statements. As previously described, these penalties are assigned to reflect the costs of maintaining an index for queries having these statements. Next, at step 615 similar indexes are combined. At step 616, the indexes are sorted based on total benefit and the least beneficial indexes are removed (e.g., the bottom 20 percent of the recommended indexes are eliminated in the currently preferred embodiment).

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a database system including a database optimizer normally used for generating an access plan for processing a given database query run against the database system, an optimizer-based method for recommending database indexes to be created for maximizing system performance, the method comprising:

capturing a workload representative of database queries employed during prior database system use;

monitoring the database optimizer as it prepares to optimize each of the queries, by recording all potential database physical indexes which do not currently exist in the database and for which the database optimizer searched during a preoptimization phase that occurs prior to access plan generation;

creating an initial set of virtual indexes each simulating presence of a class of potential database physical indexes that were recorded during said monitoring step, wherein each said virtual index comprises an in-memory data structure corresponding to a set of potential database physical indexes;

computing cost benefits for different subsets of the set of virtual indexes by invoking the database optimizer again for purposes of providing cost estimates for the workload for each such subset, progressively eliminating a fixed percentage of virtual indexes with the lowest expected improvement in the query's estimated cost from consideration until space that would be occupied by the virtual indexes is less than or equal to a user-specified value; and recommending database physical indexes to be created based on those virtual indexes that have favorable estimated cost benefits for the captured workload and have not been eliminated from consideration.

2. The method of claim 1, wherein the capturing step includes:

displaying a screen input button that a user may invoke to record a usage session as a workload.

3. The method of claim 1, wherein the workload represents user execution of a database application with a typical workload that is contemplated for the application.

4. The method of claim 1, wherein the workload includes information recording text of all the queries operating during the capture of the workload.

5. The method of claim 1, wherein the workload includes information recording settings for certain options that affect how queries are optimized.

6. The method of claim 1, wherein the capturing step includes:

capturing information about a set of workloads to define a problem instance.

7. The method of claim 1, further comprising:

setting a limit on how much disk space is available for physical indexes.

8. The method of claim 6, wherein the recommending step takes into account the limit on disk space available for physical indexes.

9. The method of claim 6, wherein the recommending step includes:

if the physical indexes to be recommended for creation exceed the limit on disk space available for physical indexes, removing some of the physical indexes from consideration.

10. The method of claim 9, wherein the physical indexes removed from consideration are ones having less favorable cost benefits for the captured workload.

11. The method of claim 9, wherein the physical indexes removed from consideration comprise at least 20 percent of bottom performing indexes considered for recommendation.

12. The method of claim 1, further comprising:

specifying whether certain types of indexes should be considered at all.

13. The method of claim 1, wherein the creating virtual indexes step includes:

searching for relevant indexes that will help the system's optimizer use sargable predicates for partial index scans.

14. The method of claim 13, wherein an index consultant creates virtual indexes without specifying ordering of columns used in sargable equality predicates.

15. The method of claim 1, wherein the creating virtual indexes step includes:

searching for relevant indexes that will help provide useful orderings.

16. The method of claim 15, wherein columns of virtual indexes may be order-independent "don't care" columns that satisfy some interesting ordering wish list of the system's optimizer.

17. The method of claim 15, wherein columns of virtual indexes may have an unspecified sortedness.

18. The method of claim 1, further comprising:

collapsing some of the virtual indexes together, if feasible for the workload.

19. The method of claim 18, wherein the collapsing step includes:

identifying that columns of one virtual index are a superset of another the columns of another virtual index, and that both indexes may be combined into a single virtual index that is feasible for the workload; and identifying that sortedness of a column of a virtual index, if unspecified, may be specified to allow it to be combined with an index with identical columns but specified sortedness; and identifying that a virtual index that has columns of opposite sortedness of a second virtual index, and that both indexes may be combined into a single virtual index.

20. The method of claim 1, further comprising:

polling periodically in the method to ensure that the system is working with accurate cost information.

21. A computer-readable storage medium having processor-executable instructions for performing the method of claim 1.

22. The method of claim 1, wherein the virtual indexes are created by an index consultant that observes the optimizer's need for certain indexes during generation of access plans for said database queries.

23. A system that recommends database indexes to be created for optimizing system performance, the system comprising: a computer having at least one processor;

a database system that executes database queries, said database system including a database optimizer normally used for generating an access plan for processing each given database query run against the database system; and an optimizer-based index consultant for capturing a workload representative of database queries executed during prior system use, which monitors the database optimizer as it prepares to optimize each of the queries by recording all potential database physical indexes that do not currently exist in the database and for which the database optimizer searched during a preoptimization phase that occurs prior to access plan generation, and which creates an initial set of virtual indexes each simulating presence of a class of potential database physical indexes that were recorded during monitoring, wherein each said virtual index comprises an in-memory data structure corresponding to a set of potential database physical indexes, wherein cost benefits for different subsets of the set of virtual indexes are computed by invoking the database optimizer again for purposes of providing cost estimates for the workload for each such subset, progressively eliminating a fixed percentage of virtual indexes with the lowest expected improvement in the query's estimated cost from consideration until space that would be occupied by the virtual indexes is less than or equal to a user-specified value, and wherein database physical indexes are recommended to be created based on those virtual indexes that have favorable estimated cost benefits for the captured workload and have not been eliminated from consideration.

24. The system of claim 23, wherein the index consultant displays a screen input button that a user may invoke to record a usage session as a workload.

25. The system of claim 23, wherein the workload represents user execution of a database application with a typical workload that is contemplated for the application.

26. The system of claim 23, wherein the workload includes information recording text of all the queries operating during the capture of the workload.

27. The system of claim 23, wherein the workload includes information recording settings for certain options that affect how queries are optimized.

28. The system of claim 23, wherein the index consultant captures information about a set of workloads to define a problem instance.

29. The system of claim 23, wherein the index consultant may receive information specifying a limit on how much disk space is available for physical indexes.

30. The system of claim 29, wherein the index consultant takes into account the limit on disk space available for physical indexes.

31. The system of claim 29, wherein the index consultant removes some of the physical indexes from consideration, when sufficient disk space is unavailable.

32. The system of claim 31, wherein the physical indexes removed from consideration are ones having less favorable cost benefits for the captured workload.

33. The system of claim 31, wherein the physical indexes removed from consideration comprise at least 20 percent of bottom performing indexes considered for recommendation.

34. The system of claim 23, wherein the index consultant allows user input specifying whether certain types of indexes should be considered at all.

35. The system of claim 23, wherein the index consultant searches for relevant indexes that will help the system's optimizer use sargable predicates for partial index scans.

36. The system of claim 35, wherein the index consultant creates virtual indexes without specifying ordering of columns used in sargable equality predicates.

37. The system of claim 23, wherein the index consultant searches for relevant indexes that will help provide useful interesting (order or grouping) properties.

38. The system of claim 37, wherein columns of indexes created may reflect order-independent "don't care" columns that satisfy some interesting ordering wish lists of the system's optimizer.

39. The system of claim 23, wherein the index consultant attempts to collapse some of the virtual indexes together, if feasible for the workload.

40. The system of claim 39, wherein the index consultant attempts to identify that columns of one index are a superset of the columns of another index, and that both indexes may be combined into a single index that is feasible for the workload.

41. The system of claim 23, wherein operation of the index consultant may be polled during operation to ensure that the system is working with accurate cost information.

42. The system of claim 23, wherein the index consultant creates the virtual indexes by observing the optimizer's need for certain indexes during generation of access plans for said database queries.

* * * * *